US008020214B2

(12) United States Patent
Fujiwara et al.

(10) Patent No.: US 8,020,214 B2
(45) Date of Patent: Sep. 13, 2011

(54) TRANSMITTER, RECEIVER, AND CONTENT TRANSMITTING AND RECEIVING METHOD

(75) Inventors: Yoshinobu Fujiwara, Tokyo (JP); Kunio Honsawa, Tokyo (JP); Atsushi Nakajima, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/642,118

(22) Filed: Dec. 18, 2009

(65) Prior Publication Data
US 2010/0275022 A1    Oct. 28, 2010

(30) Foreign Application Priority Data

Apr. 24, 2009  (JP) ................. 2009-106724

(51) Int. Cl.
G06F 7/04 (2006.01)
G06F 17/30 (2006.01)
H04N 7/16 (2011.01)
(52) U.S. Cl. .............. 726/31; 726/27; 713/171; 380/44; 380/279; 380/263
(58) Field of Classification Search .................. 713/171; 380/44, 263, 279; 726/27, 31
See application file for complete search history.

(56) References Cited

U.S. PATENT DOCUMENTS

| 7,103,778 | B2* | 9/2006 | Kon et al. | 713/185 |
| 7,185,193 | B2* | 2/2007 | Watanabe et al. | 713/155 |
| 7,243,238 | B2* | 7/2007 | Watanabe et al. | 713/182 |
| 7,681,244 | B2* | 3/2010 | Morioka et al. | 726/29 |
| 7,836,507 | B2* | 11/2010 | Ono et al. | 726/26 |
| 7,929,560 | B2* | 4/2011 | Morioka | 370/419 |
| 2009/0041424 | A1* | 2/2009 | Ayaki et al. | 386/95 |
| 2009/0119784 | A1* | 5/2009 | Galuten et al. | 726/33 |
| 2009/0300767 | A1* | 12/2009 | Galuten et al. | 726/26 |

FOREIGN PATENT DOCUMENTS

| JP | 2000-322826 A | 11/2000 |
| JP | 2000-339849 A | 12/2000 |
| JP | 2002-358242 | 12/2002 |
| JP | 2006-148451 | 6/2006 |
| JP | 2008-016039 A | 1/2008 |
| JP | 2008-165975 A | 7/2008 |
| JP | 2008-299971 | 12/2008 |
| WO | WO-2005/057865 A1 | 6/2005 |

OTHER PUBLICATIONS

Japanese Office Action dated Feb. 16, 2010, Japanese Patent Application No. 2009-106724.

* cited by examiner

Primary Examiner — David García Cervetti
(74) Attorney, Agent, or Firm — Patterson & Sheridan, LLP

(57) ABSTRACT

According to one embodiment, a transmitter is configured to transmit content to a receiver. Available dubbing count is set in advance for the content such that the content can be dubbed a plurality of times. The transmitter includes a key exchanger, an encryption processor, and a dubbing management module. The key exchanger performs key exchange to share a common key with the receiver. The encryption processor encrypts, in response to a content request received from the receiver, the content with the common key to transmit the content to the receiver. The dubbing management module reduces, upon receipt of a right transfer request related to the use of the content from the receiver, the available dubbing count by dubbing count indicating the number of times of dubbing of the content. The dubbing count is contained in the right transfer request.

8 Claims, 8 Drawing Sheets

| CONTENT IDENTIFICATION INFORMATION | AVAILABLE DUBBING COUNT | RECEIVER ID | DUBBING COUNT | COMMON KEY | KEY LABEL |
|---|---|---|---|---|---|
| C | 6 | SINK1 | 2 | KXM | KXM_label |

| CONTENT IDENTIFICATION INFORMATION | DUBBING COUNT | AVAILABLE DUBBING COUNT | COMMON KEY | KEY LABEL |
|---|---|---|---|---|
| C | 2 | 0 | KXM | KXM_label |

FIG.9

| RESPONSE NO. | SITUATION |
|---|---|
| 0 | PERMIT, NO ERROR EXISTS |
| 1 | DENY, UNKNOWN ERROR EXISTS |
| 2 | DENY, RIGHT TRANSFER IS NOT CURRENTLY AVAILABLE |
| 3 | DENY, RETRANSMISSION OF RIGHT TRANSFER REQUEST IS REQUIRED USING SPECIFIED DUBBING COUNT |

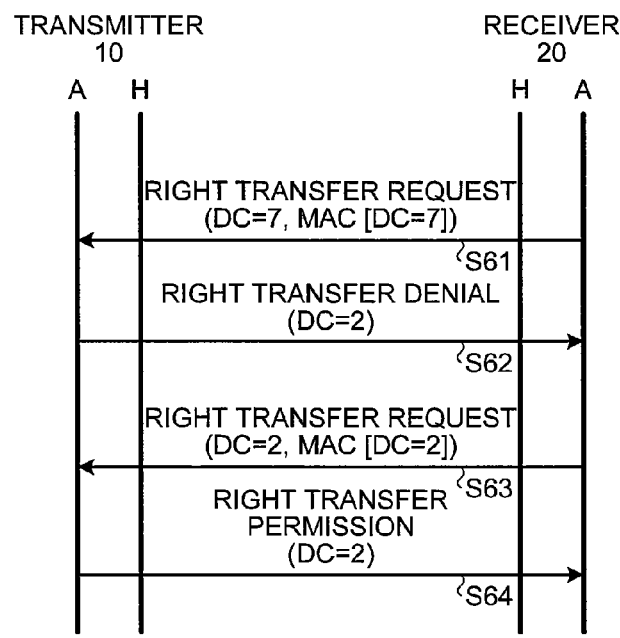
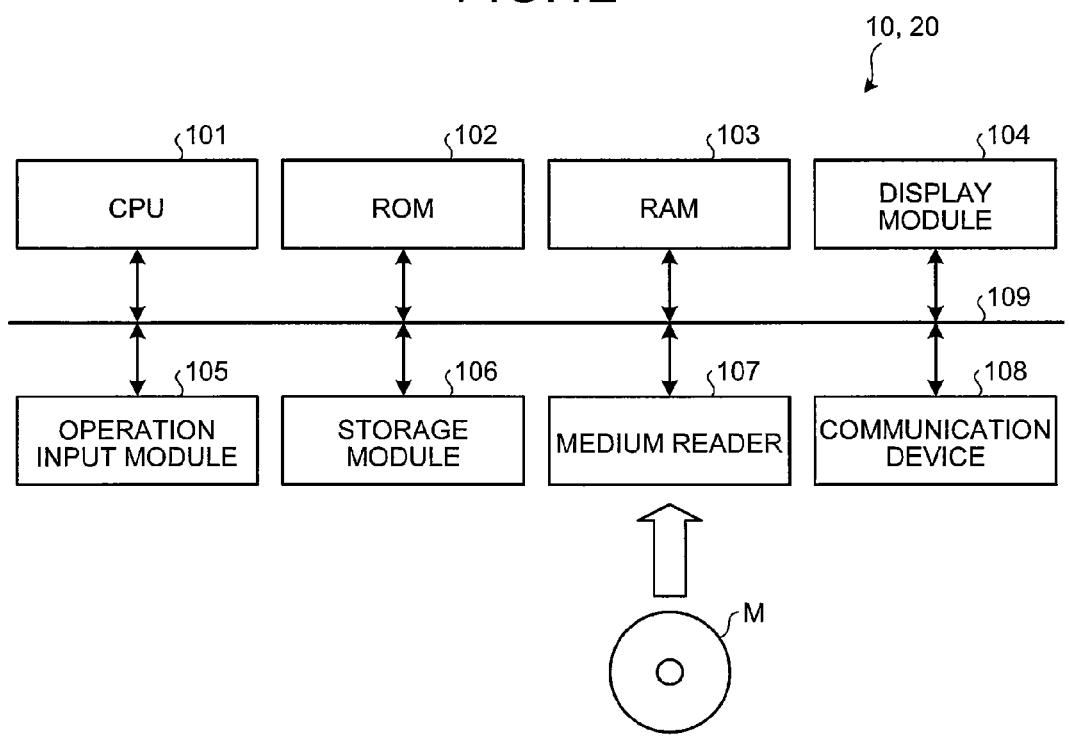

TRANSMITTER, RECEIVER, AND CONTENT TRANSMITTING AND RECEIVING METHOD

CROSS-REFERENCE TO RELATED APPLICATIONS

This application is based upon and claims the benefit of priority from Japanese Patent Application No. 2009-106724, filed Apr. 24, 2009, the entire contents of which are incorporated herein by reference.

BACKGROUND

1. Field

One embodiment of the invention relates to a transmitter that transmits content, a receiver that receives content, and a content transmitting and receiving method.

2. Description of the Related Art

With widespread of computer networks such as broadband networks and wireless local area networks (LANs), digital information devices, digital home appliances, etc. having a communication function have been increasingly used. If a plurality of digital home appliances are connected to a network, the user can enjoy content via the network. The "content" refers to various types of digital data including, for example, MPEG-2 and MPEG-4 video data and audio data, document data such as text data and image data, and the like. Although content made up of such digital data can easily be copied without loss of quality, attention has to be paid to the issue of copyright of the content.

For example, in Japanese digital broadcasting services, it is defined that a total of up to ten contents received by a recorder through broadcast waves are allowed to be stored the internal device (see, for example, "The Association for Promotion of Digital Broadcasting," "the Outline of Changes in the Dubbing 10 Rule," on line, retrieved on Apr. 9, 2009, the Internet <URL: http://www.dpa.or.jp/images/news/dub10-outline.pdf>). Digital transmission content protection (DTCP) and digital transmission content protection over Internet protocol (DTCP-IP) are commonly used to output content from a transmitter to a receiver via an in-home network while protecting the content. As to DTCP, reference may be had to "Digital transmission Licensing Administer," "Digital Transmission Content Protection Specification Volume 1 Revision 1.51," on line, retrieved on Apr. 9, 2009, the Internet <URL: http://www.dtcp.com/data/info%2020071001%20DTCP%20V1%201p51.p df>). As to DTCP-IP, reference may be had to "Digital transmission Licensing Administer," "DTCP Volume 1 Supplement E Mapping DTCP to IP, Revision 1.2," on line, retrieved on Apr. 9, 2009, the Internet <URL: http://www.dtcp.com/data/info%2020070615%20DTCP%20V1SE%201p2. pdf>). Hereinafter, DTCP and DTCP-IP are both referred to as DTCP-IP. For example, Japanese Patent Application Publication (KORAI) No. 2008-165975 discloses a conventional technology in which authentication is performed between a stream recorder/player and another recorder to exchange a key for data scramble. Copy control information obtained when data is first recorded using the key is added to the data to be transmitted. After the data is recorded on the recording device, the data is deleted from an original storage medium.

According to DTCP-IP, content is accompanied with available number of times of dubbing. The available number of times of dubbing refers to the number of times content is allowed to be dubbed. For example, when content, which can be dubbed seven times, is dubbed from a transmitter to a receiver twice, the available number of times of dubbing managed by the transmitter is reduced to six after the first dubbing, and the content becomes available for the receiver. Further, the available number of times of dubbing managed by the transmitter is reduced to five after the second dubbing, and the content becomes available for the receiver. Such dubbings may be performed in parallel. However, as with the case described above, if the dubbing of the same content is performed a plurality of times, the transmitter is required to perform the dubbing of the same content a plurality of times. Consequently, transfer time increases according to the number of times of dubbing. Further, the storage capacity required of the receiver also increases according to the number of times of dubbing. This increases the amount of communication and resources for encryption.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 9 is an exemplary table of responses to a right transfer request in the embodiment;

FIG. 11 is an exemplary sequence diagram of a process when the transmitter determines to deny right transfer in the embodiment; and FIG. 12 is an exemplary block diagram of a hardware configuration of an information processor in the embodiment.

DETAILED DESCRIPTION

Figure 1:
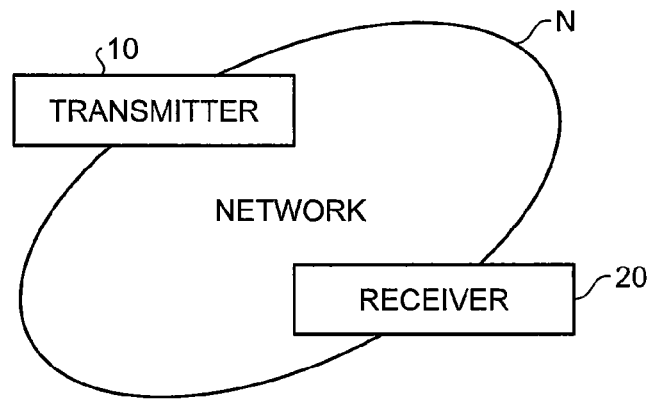
FIG. 1 is an exemplary schematic diagram of a configuration of a content transmitting/receiving system according to an embodiment of the invention.

Various embodiments according to the invention will be described hereinafter with reference to the accompanying drawings. In general, according to one embodiment of the invention, a transmitter is configured to transmit content to a receiver. Available dubbing count is set in advance for the content such that the content can be dubbed a plurality of times. The transmitter comprises a key exchanger, an encryption processor, and a dubbing management module. The key exchanger is configured to perform key exchange to share a common key with the receiver. The encryption processor is configured to encrypt, in response to a content request received from the receiver, the content with the common key to transmit the content to the receiver. The dubbing management module is configured to reduce, upon receipt of a right transfer request related to the use of the content from the receiver, the available dubbing count by dubbing count indicating the number of times of dubbing of the content. The dubbing count is contained in the right transfer request.

According to another embodiment of the invention, a receiver is configured to receive content from a transmitter. Available dubbing count is set in advance for the content such that the content can be dubbed a plurality of times. The receiver comprises a key exchanger, an encryption processor, and a dubbing management module. The key exchanger is configured to perform key exchange to share a common key with the transmitter. The encryption processor is configured to transmit a content request for the content to the transmitter and, upon receipt of the content encrypted by the transmitter from the transmitter, decrypt the content with the common key. The dubbing management module is configured to transmit a right transfer request related to the use of the content and containing dubbing count indicating the number of times of dubbing of the content to the transmitter, and set the dubbing count as the available dubbing count of the content.

According to another embodiment of the invention, there is provided a content transmitting and receiving method applied to a transmitter and a receiver that communicate content. Available dubbing count is set in advance for the content such that the content can be dubbed a plurality of times. The content transmitting and receiving method comprising: performing, by the transmitter, key exchange to share a common key with the receiver; transmitting, by the transmitter, the content encrypted with the common key to the receiver; reducing, by the transmitter, upon receipt of a right transfer request related to the use of the content from the receiver, the available dubbing count by dubbing count indicating the number of times of dubbing of the content, the dubbing count being contained in the right transfer request; performing, by the receiver, key exchange to share the common key with the transmitter; decrypting, by the receiver, upon receipt of the content encrypted by the transmitter from the transmitter, the content with the common key; and transmitting, by the receiver, the right transfer request containing the dubbing count of the content to the transmitter, and setting the dubbing count as the available dubbing count of the content.

In a content transmitting/receiving system according to an embodiment of the invention, content is moved or copied from a content transmitter (hereinafter, "transmitter") to a content receiver (hereinafter, "receiver"). It is assumed herein that, when content is moved from the transmitter, the transmitter invalidates (deletes, etc.) the content after transmitting the content. Thus, the content uniquely exists in the system. On the other hand, when content is copied, the transmitter does not invalidate the content after transmitting the content. Accordingly, a plurality of the same contents exist in the system. Hereinafter, "move" and "copy" will be collectively referred to as "dubbing". It is also assumed in the embodiment that available number of times of dubbing is set to content as available dubbing count.

The term "content" as used herein refers to digital data that requires copyright protection, i.e., digital content that needs to be protected by copyright when transmitted. It is assumed herein that "digital data that requires copyright protection" is encrypted when transmitted from the transmitter to the receiver.

FIG. 1 is a schematic diagram of a configuration of the content transmitting/receiving system according to the embodiment. As illustrated in FIG. 1, the content transmitting/receiving system comprises a transmitter 10 and a receiver 20. The transmitter 10 is connected to the receiver 20 via a network N. Examples of the network N include wired networks such as Ethernet (registered trademark), IEEE 1394, and universal serial bus (USB), and wireless networks such as IEEE 802.11, Bluetooth (registered trademark). Although only the transmitter 10 and the receiver 20 one each are connected to the network N in the example of FIG. 1, any number of them may be connected to the network N. Further, a device other than the transmitter 10 and the receiver 20 may be connected to the network N.

In response to a dubbing request, i.e., a request for dubbing of content, the transmitter 10 transmits the contend to the receiver 20 while protecting the copyright related to the use (dubbing) of the content. The receiver 20 receives the content from the transmitter 10 via the network N. Communication related to the dubbing of content is performed according to DTCP-IP between the transmitter 10 and the receiver 20. In the following, a description will be given of a functional configuration of each device that constitutes the content transmitting/receiving system.

Figure 2:
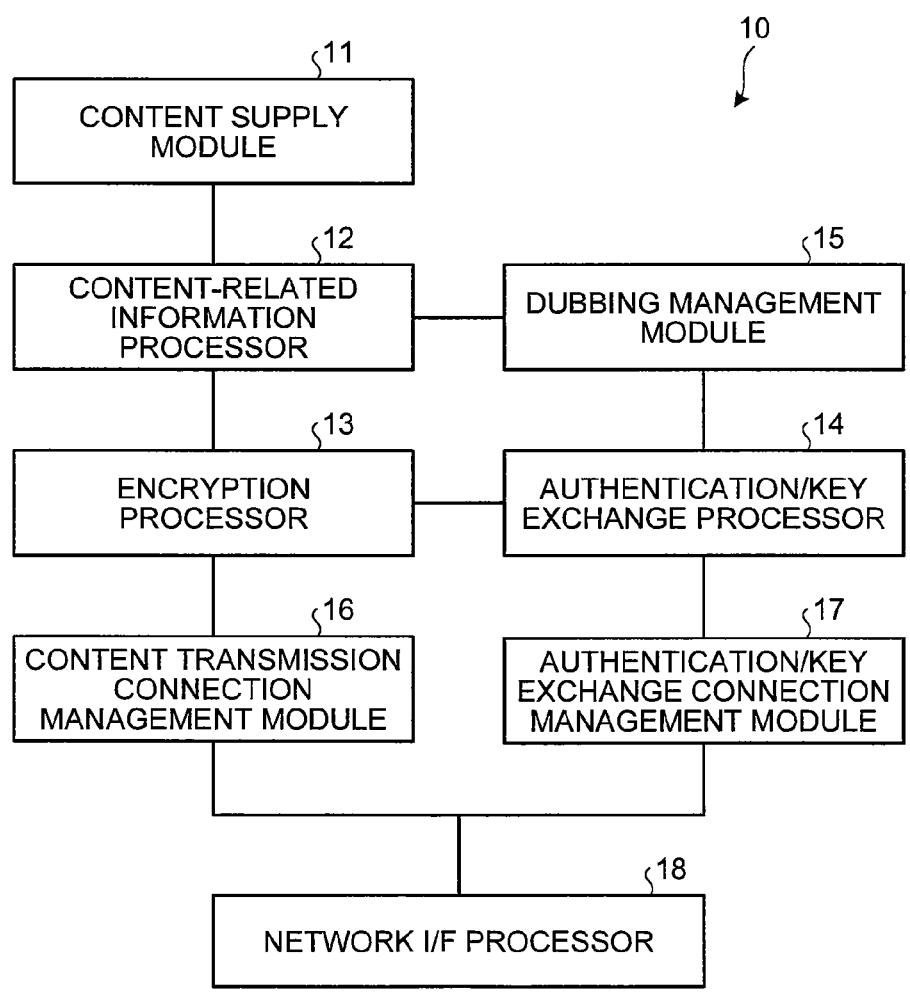
FIG. 2 is an exemplary functional block diagram of a transmitter illustrated in FIG. 1 in the embodiment.

FIG. 2 is a functional block diagram of the transmitter 10. As illustrated in FIG. 2, the transmitter 10 comprises a content supply module 11, a content-related information processor 12, an encryption processor 13, an authentication/key exchange processor 14, a dubbing management module 15, a content transmission connection management module 16, an authentication/key exchange connection management module 17, and a network interface (I/F) processor 18.

The content supply module 11 stores content of plain text in a storage module 106, which will be described later, or the like and reads content to be dubbed in response to a dubbing request to supply the content to the content-related information processor 12. The dubbing request may include, in addition to content identification information that uniquely identifies the content to be dubbed, dubbing count indicating the number of times of dubbing of the content, a receiver ID (for example, Internet protocol (IP) address, etc.) for identifying the receiver 20 that has transmitted the dubbing request.

The content-related information processor 12 outputs the content to be dubbed received from the content supply module 11 to the encryption processor 13. Besides, the content-related information processor 12 notifies the dubbing management module 15 of information related to the content to be dubbed, such as the content identification information, the dubbing count, the receiver ID, and in addition to them, available dubbing count indicating available number of times of dubbing of the content. Incidentally, in the embodiment, the dubbing count and the available dubbing count satisfy the relation "dubbing count <available dubbing count".

Further, on receipt of an available dubbing count reduction notification from the dubbing management module 15, the content-related information processor 12 reduces the available dubbing count of the content to be dubbed to a value indicated by the available dubbing count reduction notification. If the available dubbing count reduction notification indicates 0 (zero) to set the available dubbing count to 0, the content-related information processor 12 disables the use of the content.

The encryption processor 13 encrypts the content to be dubbed using a common key shared with the receiver 20. Hereinafter, content encrypted by the encryption processor 13 will be referred to as "encrypted content".

The authentication/key exchange processor 14 performs authentication/key exchange process with the receiver 20 to generate a common key to encrypt content and a key label that identifies the common key, thereby transmitting them to the receiver 20 together with information on the dubbing count.

The authentication/key exchange processor 14 notifies the dubbing management module 15 of a right transfer request from the receiver 20. The authentication/key exchange processor 14 also transmits information on right transfer permission or right transfer denial notified by the dubbing management module 15 to the receiver 20.

In the authentication/key exchange process, the transmitter 10 authenticates the receiver 20 as a device properly licensed by a specific license organization, and vice versa. If the transmitter 10 and the receiver 20 are both authenticated as a licensed device, a common key is generated. That is, when the authentication/key exchange process is successful, the transmitter 10 and the receiver 20 can share a common key used to encrypt or decrypt content. The authentication can be performed by a commonly known method such as international organization for standardization/international electrotechnical commission (ISO/IEC) 9798-2 or ISO/IEC 9798-3. As an encryption algorithm to encrypt or decrypt content can be used a commonly known one such as advanced encryption standard (AES) algorithm.

The dubbing management module 15 receives available dubbing count of content corresponding to a dubbing request from the content-related information processor 12. The dubbing management module 15 also receives information such as receiver ID and dubbing count used in the authentication/key exchange process from the authentication/key exchange processor 14. Thus, with respect to one content to be dubbed in response to a dubbing request, the dubbing management module 15 associates available dubbing count, receiver ID, and dubbing count to manage them as content-related information.

Further, upon receipt of a right transfer request from the receiver 20, the dubbing management module 15 determines whether to permit right transfer. When determining that right transfer is permissible, the dubbing management module 15 notifies the content-related information processor 12 of an available dubbing count reduction notification instructing to reduce available dubbing count, and sends a right transfer permission to the receiver 20.

Figures 3, 4:
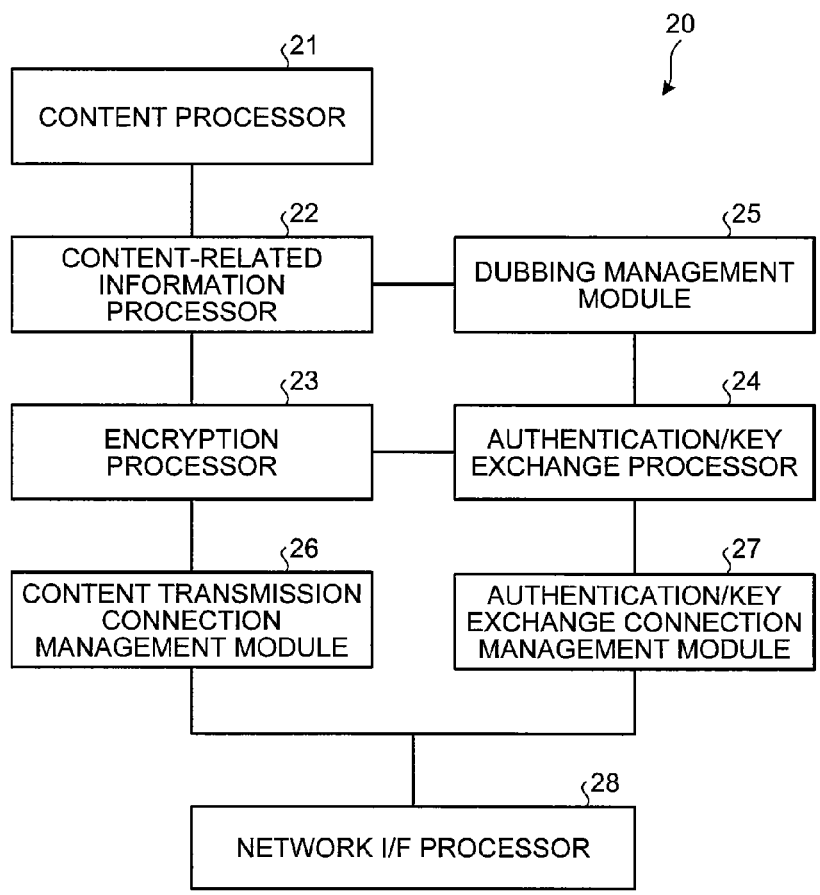
FIG. 3 is an exemplary table of content-related information managed by a dubbing management module illustrated in FIG. 2 in the embodiment.
FIG. 4 is an exemplary functional block diagram of a receiver illustrated in FIG. 1 in the embodiment.

FIG. 3 illustrates an example of content-related information managed by the dubbing management module 15. As illustrated in FIG. 3, the dubbing management module 15 manages, with respect to one content to be dubbed, "content identification information", "available dubbing count", "receiver ID" that identifies the receiver 20 to which the content is to be dubbed, and "dubbing count" indicating a requested number of times of dubbing in association with one another. Incidentally, as indicated by a portion encircled by broken line, the dubbing management module 15 may manage the above information further in association with a common key and a key label generated by the authentication/key exchange processor 14.

Referring back to FIG. 2, the content transmission connection management module 16 manages connection for transmitting content established between the transmitter 10 and the receiver 20. The authentication/key exchange connection management module 17 manages connection for authentication and key exchange established between the transmitter 10 and the receiver 20. The network I/F processor 18 controls a communication device 108, which will be described later, and performs network processing such as to convert content data, a command, etc. to be transmitted to the receiver 20 into packets.

In the following, the receiver 20 will be described. FIG. 4 is a functional block diagram of the receiver 20. As illustrated in FIG. 4, the receiver 20 comprises a content processor 21, a content-related information processor 22, an encryption processor 23, an authentication/key exchange processor 24, a dubbing management module 25, a content transmission connection management module 26, an authentication/key exchange connection management module 27, and a network I/F processor 28.

The content processor 21 outputs content to be dubbed received from the content-related information processor 22 to a display module 104, which will be described later, as well as storing it in the storage module 106.

The content-related information processor 22 feeds content decrypted by the encryption processor 23 to the content supply module 11 such that the content is processed according to information related to the content (copy control information). Further, the content-related information processor 22 receives dubbing count corresponding to the content decrypted by the encryption processor 23, and sets it as available dubbing count of the content.

The encryption processor 23 decrypts encrypted content received from the transmitter 10 using a common key shared with the transmitter 10 through the authentication/key exchange processor 24.

The authentication/key exchange processor 24 performs authentication/key exchange process with the transmitter 10. Besides, if the authentication/key exchange process is successful, the authentication/key exchange processor 24 receives information such as a common key used to decrypt encrypted content, the key label of the common key, and dubbing count, thereby notifying the dubbing management module 25 of the information. The authentication/key exchange processor 24 manages a key label and a common key shared with the transmitter 10, and feeds them to the encryption processor 23.

Besides, the authentication/key exchange processor 24 transmits a right transfer request notified by the dubbing management module 25 to the transmitter 10. On receipt of a right transfer permission from the transmitter 10, the authentication/key exchange processor 24 notifies the dubbing management module 25 of the event.

The dubbing management module 25 receives information on dubbing count used in the authentication/key exchange process from the authentication/key exchange processor 14, and manages it with content identification information of content to be dubbed as content-related information on the content. Having detected that the receipt of content (encrypted content) corresponding to a dubbing request is completed, the dubbing management module 25 transmits a right transfer request including the dubbing count to the transmitter 10.

On receipt of a right transfer permission from the transmitter 10, the dubbing management module 25 notifies the content-related information processor 22 of dubbing count related to received content. When receiving a right transfer denial from the transmitter 10 together with desired dubbing count, which will be described later, the dubbing management module 25 resets the dubbing count related to content to be dubbed to the desired dubbing count, and transmits a right transfer request again to the transmitter 10.

Figures 5, 6:
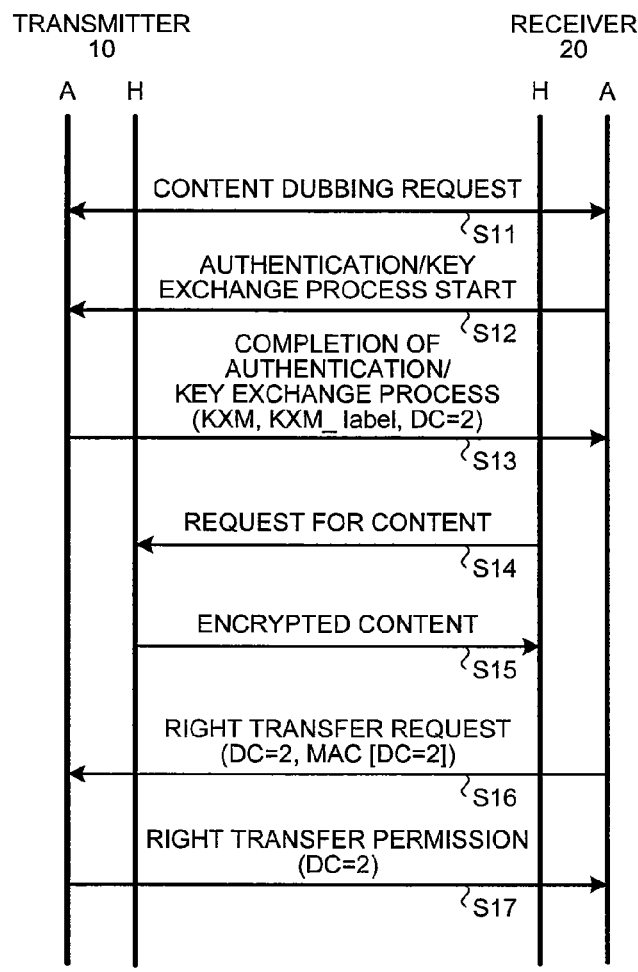
FIG. 5 is an exemplary table of content-related information managed by a dubbing management module illustrated in FIG. 4 in the embodiment.
FIG. 6 is an exemplary sequence diagram of the operation of the content transmitting/receiving system in the embodiment.

FIG. 5 illustrates an example of content-related information managed by the dubbing management module 25. As illustrated in FIG. 5, the dubbing management module 25 manages, with respect to one content to be dubbed, "content identification information" of the content and "dubbing count" in association with each other. When a dubbing request is issued and the authentication/key exchange process is successful between the transmitter 10 and the receiver 20, the dubbing management module 25 receives information on dubbing count used in the authentication/key exchange process from the authentication/key exchange processor 14, and manages it with content identification information. As indicated by a portion encircled by broken line, the dubbing management module 25 may manage the above information further in association with available dubbing count, a common key, and a key label.

Referring back to FIG. 4, the content transmission connection management module 26 manages connection for transmitting and receiving content established between the transmitter 10 and the receiver 20. The authentication/key exchange connection management module 27 manages connection for authentication and key exchange established between the transmitter 10 and the receiver 20. The network I/F processor 28 controls the communication device 108, which will be described later, and performs network processing such as to convert a command, etc. to be transmitted to the transmitter 10 into packets.

A description will now be given of the operation of the content transmitting/receiving system of the embodiment. FIG. 6 is a sequence diagram of an example of the operation of the content transmitting/receiving system. FIG. 6 illustrates an example in which the same content is dubbed twice from the transmitter 10 to the receiver 20 as two different contents. In the example of FIG. 6, while communication is performed between the transmitter 10 and the receiver 20 via a connection H for content transmission and a connection A for command transmission, it is not so limited.

First, according to an instruction provided from the user of the transmitter 10 or the receiver 20, a request to dub content is transmitted from the transmitter 10 to the receiver 20 (or from the receiver 20 to the transmitter 10) (S11). In response to the request, the authentication/key exchange processor 24 of the receiver 20 starts authentication/key exchange process through the connection A (S12).

After checking that the authentication/key exchange process is successful at 512, the authentication/key exchange processor 14 of the transmitter 10 generates a common key KXM used to encrypt/decrypt the content between the transmitter 10 and the receiver 20 and a key label KXM_label. The authentication/key exchange processor 14 then transmits the common key KXM and the key label KXM_label to the receiver 20 together with dubbing count DC=2 (S13).

On the other hand, in the receiver 20, when the authentication/key exchange processor 24 receives the common key KXM, the key label KXM_label, and the dubbing count DC=2, the encryption processor 23 transmits a content request for the content to be dubbed to the transmitter 10 through the connection H (S14).

In response to the content request received from the receiver 20, the encryption processor 13 of the transmitter 10 encrypts the requested content, i.e., the content to be dubbed, using the common key KXM shared with the receiver 20. The encryption processor 13 then transmits the content to the receiver 20 as encrypted content (S15).

When the receiver 20 receives the encrypted content, the encryption processor 23 decrypts the encrypted content using the common key KXM, and outputs it to the content-related information processor 22. On completion of the transmission/receipt of the encrypted content, the dubbing management module 25 transmits a right transfer request with respect to the content to be dubbed to the transmitter 10 together with the dubbing count DC=2 and a message authentication code (MAC) value of the dubbing count (MAC [DC=2]) through the connection A (S16). The MAC value is MAC of the dubbing count and is used to verify the dubbing count. How to calculate the MAC value is not particularly limited, and the MAC value may be calculated by, for example, a commonly known method using a hash function such as SHA-1.

Upon receipt of the right transfer request from the receiver 20, the dubbing management module 15 of the transmitter 10 determines whether to accept the right transfer request based on the dubbing count contained therein. Having determined to accept the right transfer request, the dubbing management module 15 transmits a right transfer permission to the receiver 20 together with the dubbing count DC=2 through the connection A (S17). The process when the dubbing management module 15 denies the right transfer request will be described later in connection with FIG. 11.

Figure 7:
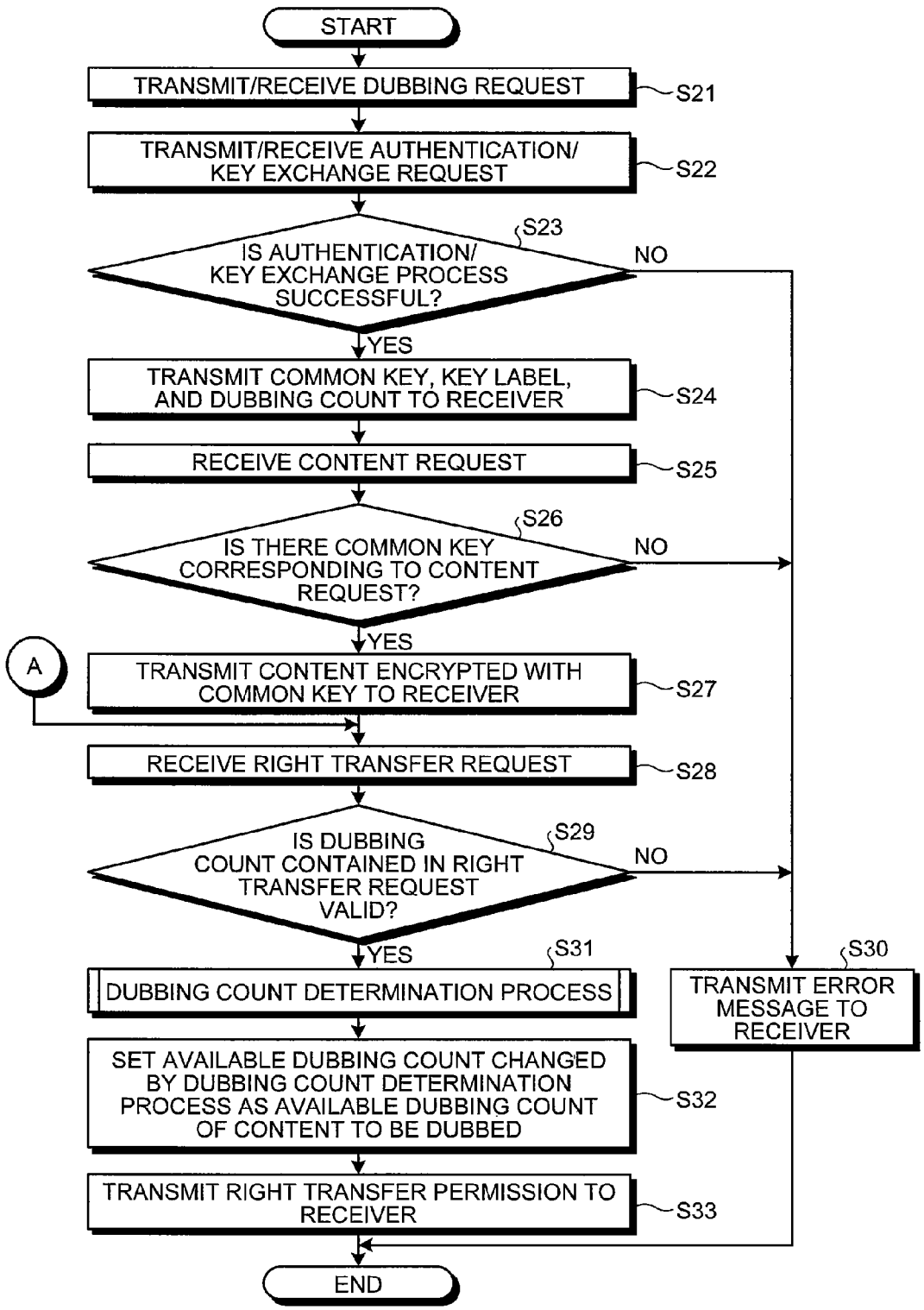
FIG. 7 is an exemplary flowchart of a content dubbing process performed by the transmitter in the embodiment.

With reference to FIG. 7, the operation of the transmitter 10 will be described. FIG. 7 is a flowchart of an example of content dubbing process (dubbing process) performed by the transmitter 10.

First, the transmitter 10 receives a dubbing request for requesting a specific content from the receiver 20, or transmits a dubbing request for providing a specific content to the receiver 20 (S21). At this point, the content-related information processor 12 notifies the dubbing management module 15 of available dubbing count of the content to be dubbed in response to the dubbing request as well as outputting the content to the encryption processor 13. The dubbing management module 15 manages content identification information of the content to be dubbed, available dubbing count of the content, receiver ID of the receiver 20, dubbing count, etc. as dubbing-related information.

Thereafter, the authentication/key exchange processor 14 receives an authentication/key exchange request requesting to start authentication/key exchange process from the receiver 20, or transmits an authentication/key exchange request requesting to start authentication/key exchange process to the receiver 20, thereby starting authentication/key exchange process with the authentication/key exchange processor 24 of the receiver 20 (S22). The authentication/key exchange processor 14 determines whether the authentication/key exchange process is successful (S23). Having determined that the authentication/key exchange process has failed (No at S23), the authentication/key exchange processor 14 transmits an error message indicating the failure to the receiver 20 (S30). After that, the process ends.

On the other hand, having determined that the authentication/key exchange process is successful (Yes at S23), the authentication/key exchange processor 14 generates a common key to encrypt/decrypt the content and a key label of the common key, thereby transmitting them to the receiver 20 together with the dubbing count of the content to be dubbed managed by the dubbing management module 15 (S24).

Subsequently, upon receipt of a content request from the receiver 20 (S25), the encryption processor 13 determines whether the dubbing management module 15 manages a common key corresponding to the content to be dubbed requested by the content request (S26). Having determined that the dubbing management module 15 does not manage such a common key (No at S26), the encryption processor 13 transmits an error message indicating this to the receiver 20 (S30). After that, the process ends.

On the other hand, having determined that the dubbing management module 15 manages the common key (Yes at S26), the encryption processor 13 encrypts the content to be dubbed obtained from the content-related information processor 12 using the common key, and transmits it to the receiver 20 (S27).

Upon receipt of a right transfer request from the receiver 20 (S28), the dubbing management module 15 verifies the dubbing count based on the dubbing count and a MAC value contained in the right transfer request (S29). More specifically, the dubbing management module 15 calculates the MAC value for verification from the dubbing count contained in the right transfer request using the same hash function as used in the receiver 20. The dubbing management module 15 then compares the MAC value for verification with the MAC value contained in the right transfer request to verify the dubbing count.

When the dubbing count is not valid (No at S29), the dubbing management module 15 transmits an error message (right transfer denial) indicating this to the receiver 20 (S30). After that, the process ends.

Figure 8:
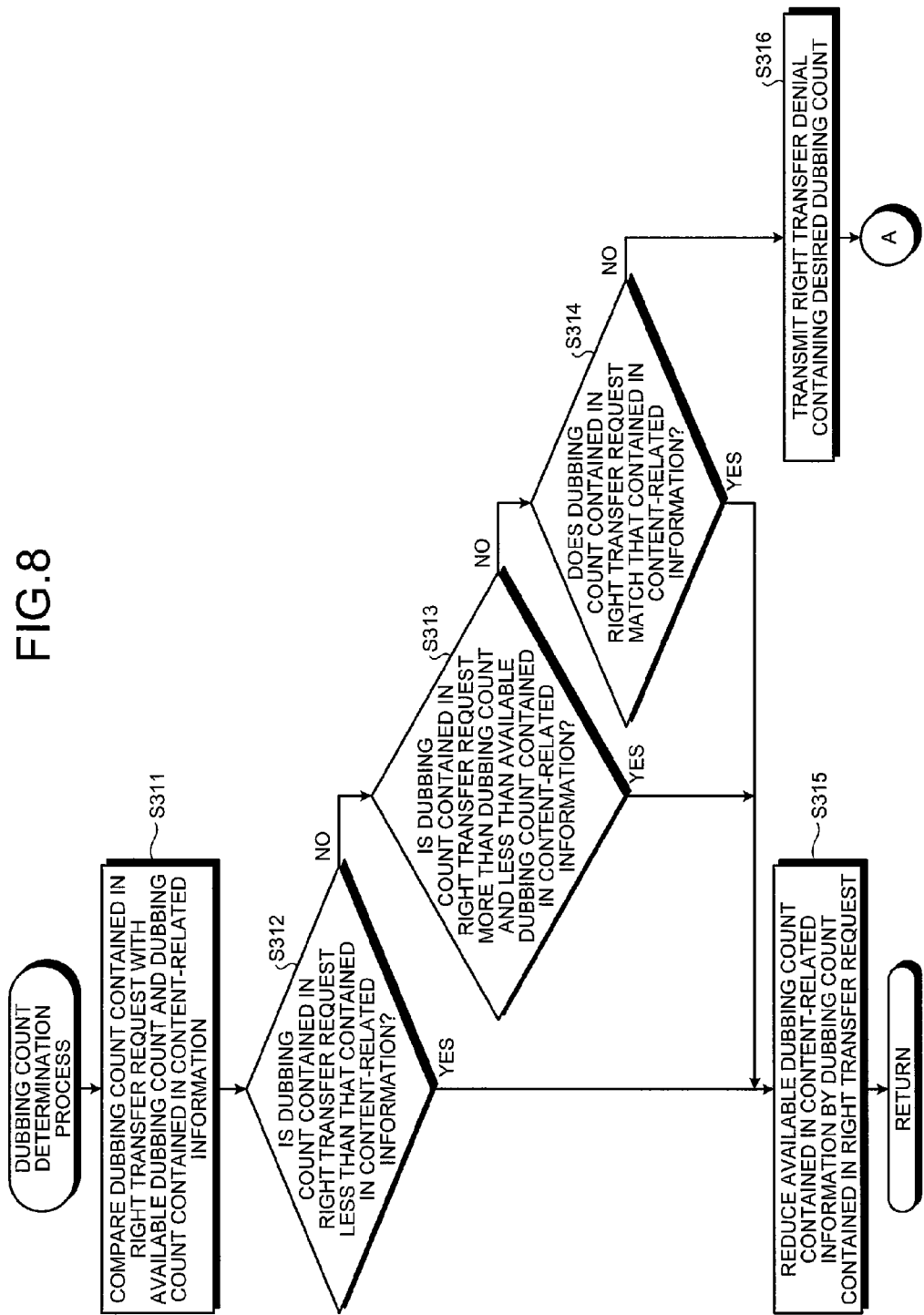
FIG. 8 is an exemplary flowchart of a dubbing count determination process illustrated in FIG. 7 in the embodiment.

On the other hand, when the dubbing count is valid (Yes at S29), the dubbing management module 15 performs a dubbing count determination process based on the dubbing count contained in the right transfer request, and the available dubbing count and dubbing count contained in content-related information of the content to be dubbed (S31). With reference to FIG. 8, a description will be given of the dubbing count determination process at 531.

FIG. 8 is a flowchart of the dubbing count determination process. First, the dubbing management module 15 compares the dubbing count contained in the right transfer request with the available dubbing count and dubbing count contained in the content-related information (S311). Having determined that the dubbing count contained in the right transfer request is less than that contained in the content-related information (Yes at S312), the dubbing management module 15 reduces the available dubbing count contained in the content-related information by the dubbing count contained in the right transfer request (S315). Then, the process proceeds to S32.

Having determined that the dubbing count contained in the right transfer request is more than that contained in the content-related information (No at S312) and also is less than the available dubbing count contained in the content-related information (Yes at S313), the dubbing management module 15 reduces the available dubbing count contained in the content-related information by the dubbing count contained in the right transfer request (S315). Then, the process proceeds to S32.

Having determined that the dubbing count contained in the right transfer request matches that contained in the content-related information (No at S312, No at S313, Yes at S314), the dubbing management module 15 reduces the available dubbing count contained in the content-related information by the dubbing count contained in the right transfer request (S315). Then, the process proceeds to S32.

Having determined that the dubbing count contained in the right transfer request is more than that contained in the content-related information (No at S312) and also is more than the available dubbing count contained in the content-related information (No at S313), the dubbing management module 15 denies the dubbing count contained in the right transfer request. The dubbing management module 15 then transmits a right transfer denial that contains desired dubbing count different from the dubbing count to the receiver 20 (S316). After that, the process returns S28. The desired dubbing count is not particularly limited as long as it is less than the available dubbing count. For example, dubbing count contained in the content-related information may be used as the desired dubbing count. Alternatively, the user of the transmitter 10 or the receiver 20 may provide a value less than the available dubbing count as the desired dubbing count.

Referring back to FIG. 7, the dubbing management module 15 notifies the content-related information processor 12 of the available dubbing count changed at S31 in the form of an available dubbing count reduction notification to reduce the available dubbing count of the content to be dubbed to a value indicated by the available dubbing count reduction notification (S32). The dubbing management module 15 then transmits a right transfer permission to the receiver 20 (S33). After that, the process ends.

FIG. 9 illustrates examples of responses to a right transfer request from the transmitter 10 (the dubbing management module 15). In response to a right transfer request from the receiver 20, the dubbing management module 15 returns, for example, one of four types of responses (response No. 0 to 3) as illustrated in FIG. 9 to the receiver 20.

The response No. 0 indicates that no error exists, i.e., transmission of a right transfer permission. The response No. 0 is applied to the case, for example, where dubbing count contained in a right transfer request from the receiver 20 matches that managed by the transmitter 10 or is less than available dubbing count managed by the transmitter 10.

The response No. 1 indicates unknown error, i.e., transmission of a right transfer denial. The response No. 1 is applied to the case, for example, where a right transfer request from the receiver 20 is not valid.

The response No. 2 indicates that right transfer is not currently available, i.e., transmission of a right transfer denial. The response No. 2 is applied to the case, for example, where the transmitter 10 is not yet ready for right transfer.

The response No. 3 instructs to retransmit a right transfer request using a specified dubbing count (desired dubbing count), i.e., transmission of a right transfer denial. The response No. 3 is applied to the case, for example, where the transmitter 10 cannot permit dubbing count contained in a right transfer request from the receiver 20.

Figure 10:
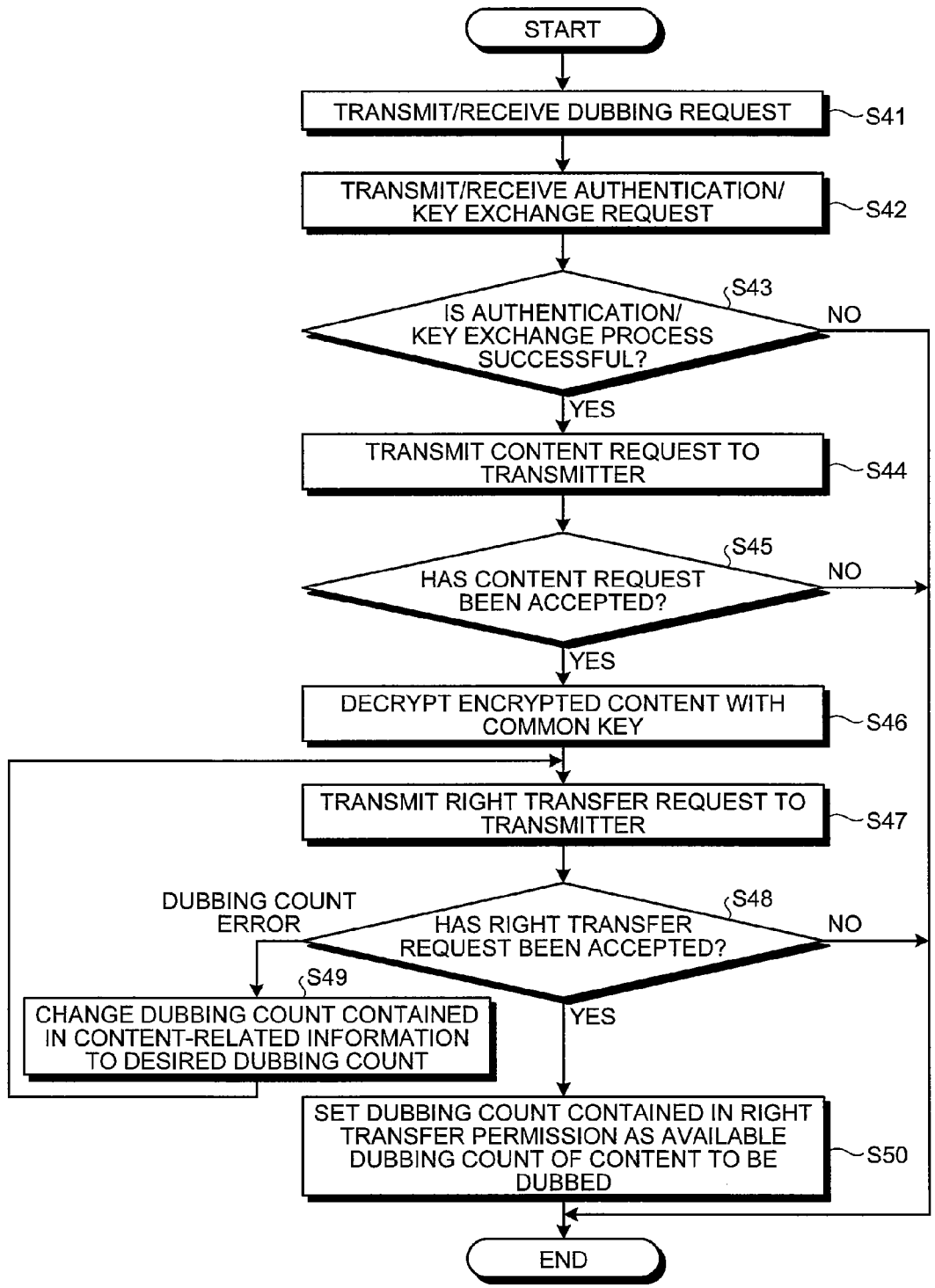
FIG. 10 is an exemplary flowchart of a content dubbing process performed by the receiver in the embodiment.

With reference to FIG. 10, the operation of the receiver 20 will be described. FIG. 10 is a flowchart of an example of content dubbing process (dubbing process) performed by the receiver 20.

First, the receiver 20 receives a dubbing request for providing a specific content from the transmitter 10, or transmits a dubbing request for requesting a specific content to the transmitter 10 (S41).

Thereafter, the authentication/key exchange processor 24 receives an authentication/key exchange request requesting to start authentication/key exchange process from the transmitter 10, or transmits an authentication/key exchange request requesting to start authentication/key exchange process to the transmitter 10, thereby starting authentication/key exchange process with the authentication/key exchange processor 14 of the transmitter 10 (S42).

The authentication/key exchange processor 24 determines whether the authentication/key exchange process is successful based on a response from the transmitter 10 (S43). If receiving an error message from the transmitter 10, the authentication/key exchange processor 24 determines that the authentication/key exchange process has failed (No at S43). Thus, the process ends.

On the other hand, if receiving information such as a common key, the key label of the common key, and dubbing count from the transmitter 10, the authentication/key exchange processor 24 determines that the authentication/key exchange process is successful (Yes at S43). Thus, the process proceeds to S44. Incidentally, the dubbing management module 25 manages content-related information obtained by the above process, such as content identification information that identifies the content to be dubbed, the dubbing count of the content, and the like.

Thereafter, the encryption processor 23 transmits a content request for the content to be dubbed to the transmitter 10 (S44). The encryption processor 23 then determines whether the content request has been accepted based on a response thereto from the transmitter 10 (S45). If receiving an error message from the transmitter 10, the encryption processor 23 determines that the content request has been denied (No at S45). Thus, the process ends.

On the other hand, if receiving encrypted content from the transmitter 10, the encryption processor 23 determines that the content request has been accepted (Yes at S45). The encryption processor 23 decrypts the encrypted content with a common key corresponding to the encrypted content (S46), and then outputs it to the content-related information processor 22.

On completion of receipt of the content, the dubbing management module 25 generates a right transfer request containing the dubbing count, the MAC value of the dubbing count, and the like, and transmits the right transfer request to the transmitter 10 (S47). The dubbing management module 25 then determines whether the right transfer request has been accepted based on a response thereto from the transmitter 10 (S48). If receiving a right transfer denial from the transmitter 10, the dubbing management module 25 determines that the right transfer request has been denied (No at S48). Thus, the process ends.

If receiving a right transfer denial from the transmitter 10 together with desired dubbing count, the dubbing management module 25 determines that the dubbing count has not been accepted (dubbing count error at S48). Accordingly, the dubbing management module 25 changes the dubbing count contained in the content-related information to a value indicated as the desired dubbing count (S49). After that, the process returns to S47. With this, a right transfer request containing the new dubbing count, the MAC value of the new dubbing count, and the like is transmitted to the transmitter 10.

While the dubbing count is described above as being immediately changed to the desired dubbing count, it is not so limited. A message indicating that the dubbing count is to be changed may be displayed on the display module 104, which will be described later, to notify the user of the receiver 20 of this event so that it can be determined based on input from the user through an operation input module 105, which will be described later, whether to accept the desired dubbing count.

On the other hand, if receiving a right transfer permission from the transmitter 10, the dubbing management module 25 determines that the right transfer request has been accepted (Yes at S48). The dubbing management module 25 notifies the content-related information processor 22 of dubbing count contained in the right transfer permission so that the content-related information processor 22 sets the dubbing count as available dubbing count of the content to be dubbed (S50). Thus, the process ends.

FIG. 11 is a sequence diagram of an example of a process when the transmitter 10 determines to deny right transfer. The process until the right transfer is previously described in connection with FIG. 6, and the description will not be repeated.

On completion of the transmission/receipt of encrypted content, the dubbing management module 25 of the receiver 20 transmits a right transfer request to the transmitter 10 together with dubbing count DC=7 and a MAC value of the dubbing count (MAC [DC=7]) through the connection A (S61).

When determining that the dubbing count DC=7 contained in the right transfer request is more than that contained in the entry that the dubbing management module 15 manages and also available dubbing count, the dubbing management module 15 of the transmitter 10 transmits a right transfer denial to the receiver 20 together with desired dubbing count by the response No. 3 (S62). In the example of FIG. 11, a value 2 (DC=2) is transmitted as the desired dubbing count.

Having received the right transfer denial (DC=2) from the transmitter 10, the dubbing management module 25 transmits through the connection A a right transfer request again to the transmitter 10 that contains dubbing count (DC=2) notified as desired dubbing count and a MAC value of the dubbing count (MAC [DC=2]) (S63). Thus, the dubbing management module 15 of the transmitter 10 transmits a right transfer permission to the receiver 20 together with the dubbing count DC=2 (S64).

As described above, according to the embodiment, even when the same content is dubbed a plurality of times from the transmitter 10 to the receiver 20, a common key to encrypt/decrypt the content can be shared in each dubbing process. With this, encryption of content to be dubbed is reduced to once. Thus, resources related to encryption/decryption of the content can be reduced.

In the following, a hardware configuration of the transmitter 10 and the receiver 20 will be described. The transmitter 10 and the receiver 20 may be realized by using an information processor such as a hard disk drive (HDD) recorder and a personal computer (PC).

FIG. 12 is a block diagram of a hardware configuration of such an information processor. As illustrated in FIG. 12, the information processor comprises a central processing unit (CPU) 101, a read only memory (ROM) 102, a random access memory (RAM) 103, the display module 104, the operation input module 105, the storage module 106, a medium reader 107, and the communication device 108, which are connected one another by a bus 109. The ROM 102 stores a basic input-output system (BIOS) and the like. The RAM 103 is rewritable and stores various types of data. The display module 104 displays information such as the progress and result of a process for the user. The display module 104 may comprise a cathode ray tube (CRT), a liquid crystal display (LCD), or the like. The operation input module 105 comprises a keyboard and buttons through which the user provides input such as a command and information to the CPU 101. The storage module 106 functions as various types of databases and stores various types of programs. The storage module 106 may be, for example, HDD. The medium reader 107 stores data, distributes data to the outside, and obtains data from the outside using a storage medium M. The medium reader 107 may be, for example, a compact disc-read only memory (CD-ROM) drive. The communication device 108 communicates data with an external device through a communication line.

In the information processor, the CPU 101 loads a program from the storage module 106 into the RAM 103 and executes the program, thereby implementing the various functional modules. In other words, the functional modules of the transmitter 10 or those of the receiver 20 are implemented by cooperation between the CPU 101 and a program stored in the storage module 106. Depending on the program stored in the storage module 106, the information processor functions as the transmitter 10 or the receiver 20.

The program is stored in the storage medium M and installed on the storage module 106. Examples of the storage medium M include various types of optical discs such as CD-ROM and digital versatile disc (DVD), various types of magnetic discs such as magneto-optical disk and flexible disk (FD), semiconductor memory, and the like. That is, a portable medium, for example, a magnetic medium such as FD as well as an optical information storage medium such as CD-ROM may be the storage medium M for storing the program.

Besides, the program may be obtained from the outside through the communication device 108, and installed on the storage module 106.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A transmitter configured to transmit content to a receiver, available dubbing count being set in advance for the content such that the content can be dubbed a plurality of times, the transmitter comprising:
    a key exchanger configured to perform key exchange to share a common key with the receiver;
    an encryption processor configured to encrypt, in response to a content request received from the receiver, the content with the common key to transmit the content to the receiver; and
    a dubbing management module configured to reduce, upon receipt of a right transfer request related to use of the content from the receiver, the available dubbing count by a dubbing count indicating the number of times of dubbing the content, the dubbing count being contained in the right transfer request, wherein
    the key exchanger is configured to transmit the common key to the receiver together with the dubbing count of the content, and
    the dubbing management module is configured to receive the dubbing count of the content transmitted by the key exchanger from the receiver as the dubbing count contained in the right transfer request.

2. The transmitter of claim 1, wherein, when the dubbing count contained in the right transfer request is less than the available dubbing count, the dubbing management module reduces the available dubbing count by the dubbing count and transmits a message indicating acceptance of the dubbing count to the receiver.

3. The transmitter of claim 1, wherein, when the dubbing count contained in the right transfer request is equal to or more than the available dubbing count, the dubbing management module transmits a message indicating denial of the dubbing count to the receiver together with a value different from the dubbing count as desired dubbing count.

4. The transmitter of claim 1, wherein the dubbing management module is configured to manage, with respect to the content to be dubbed, content identification information that identifies the content, the available dubbing count, and dubbing count transmitted by the key exchanger to the receiver as content-related information.

5. A receiver configured to receive content from a transmitter, available dubbing count being set in advance for the content such that the content can be dubbed a plurality of times, the receiver comprising:
    a key exchanger configured to perform key exchange to share a common key with the transmitter;
    an encryption processor configured to transmit a content request for the content to the transmitter and, upon receipt of the content encrypted by the transmitter from the transmitter, decrypt the content with the common key; and
    a dubbing management module configured to transmit a right transfer request related to use of the content and containing a dubbing count indicating the number of times of dubbing the content to the transmitter, and set the dubbing count as the available dubbing count of the content, wherein
    the key exchanger is configured to receive the common key from the transmitter together with the dubbing count of the content, and
    the dubbing management module is configured to transmit the dubbing count of the content received by the key exchanger to the transmitter as the dubbing count contained in the right transfer request.

6. The receiver of claim 5, wherein the dubbing management module is configured to set dubbing count notified by the transmitter as the available dubbing count of the content.

7. The receiver of claim 6, wherein, upon receipt of a value from the transmitter that is different from the dubbing count contained in the right transfer request transmitted to the transmitter, the dubbing management module sets the value as the available dubbing count of the content.

8. A content transmitting and receiving method applied to a transmitter and a receiver that communicate content, available dubbing count being set in advance for the content such that the content can be dubbed a plurality of times, the content transmitting and receiving method comprising:
    performing, by the transmitter, key exchange to share a common key with the receiver;
    transmitting, by the transmitter, the content encrypted with the common key to the receiver;
    reducing, by the transmitter, upon receipt of a right transfer request related to use of the content from the receiver, the available dubbing count by a dubbing count indicating the number of times of dubbing the content, the dubbing count being contained in the right transfer request;
    performing, by the receiver, key exchange to share the common key with the transmitter;
    decrypting, by the receiver, upon receipt of the content encrypted by the transmitter from the transmitter, the content with the common key; and
    transmitting, by the receiver, the right transfer request containing the dubbing count of the content to the transmitter, and setting the dubbing count as the available dubbing count of the content, wherein
    the transmitter, during the performing of the key exchange, transmits the common key to the receiver together with the dubbing count of the content, and
    the dubbing count contained in the right transfer request is the dubbing count of the content transmitted with the common key.

* * * * *